(12) United States Patent
Mikkelsen et al.

(10) Patent No.: US 7,143,650 B2
(45) Date of Patent: Dec. 5, 2006

(54) PRESSURE SENSOR

(75) Inventors: Steen Mikkelsen, Bjerringbro (DK); Per Andersen, Bjerringbro (DK); Jens Peter Krog, Ulstrup (DK)

(73) Assignee: Grundfos a/s (DK)

( * ) Notice: Subject to any disclaimer, the term of this patent is extended or adjusted under 35 U.S.C. 154(b) by 0 days.

(21) Appl. No.: 10/511,002

(22) PCT Filed: Apr. 8, 2003

(86) PCT No.: PCT/EP03/03630

§ 371 (c)(1),
(2), (4) Date: Nov. 12, 2004

(87) PCT Pub. No.: WO03/087752

PCT Pub. Date: Oct. 23, 2003

(65) Prior Publication Data

US 2005/0235752 A1 Oct. 27, 2005

(30) Foreign Application Priority Data

Apr. 12, 2002 (EP) ................................. 0200838.1

(51) Int. Cl.
*G01L 9/06* (2006.01)
(52) U.S. Cl. ...................................................... 73/715

(58) Field of Classification Search .................. 73/700, 73/715, 725
See application file for complete search history.

(56) References Cited

U.S. PATENT DOCUMENTS 4,040,297 A * 8/1977 Karsmakers et al. .......... 73/725
5,627,321 A 5/1997 Korhonen et al.
6,311,561 B1 11/2001 Bang et al.

FOREIGN PATENT DOCUMENTS

| GB | 2 308 447 | 6/1997 |
|---|---|---|
| JP | 62027637 A * | 2/1987 |
| JP | 2002-005771 A | 1/2002 |

* cited by examiner

*Primary Examiner*—Edward Lefkowitz
*Assistant Examiner*—Andre Allen
(74) *Attorney, Agent, or Firm*—Jacox, Meckstroth & Jenkins

(57) ABSTRACT

This invention relates to a pressure sensor comprising a diaphragm and at least one measuring element, which is situated on the diaphragm while serving to measure a deflection of the diaphragm. A holding element is placed on at least one surface of the diaphragm in order to accommodate a seal element, whereby this holding element has a through hole, which faces the diaphragm surface while having a cross-section that corresponds to the outer contour of a seal element to be accommodated.

23 Claims, 9 Drawing Sheets

PRESSURE SENSOR

BACKGROUND OF THE INVENTION

The invention relates to a pressure sensor.

A pressure or differential pressure sensor is known from the European Patent application 97 105 396, with which a diaphragm with a measurement element located thereon is applied. The diaphragm is formed in a carrier which is sealingly clamped or bonded into a two-part mounting. The measurement element on the membrane, via electrical leads, is connected to further electronic components arranged on a circuit board, wherein the circuit board is fastened distanced to the carrier on a part of the mounting. Through-holes are formed in each case in the two parts of the mounting, in order to impinge the diaphragm with pressure. At the same time, the two parts of the mounting must be brought into sealing contact with outer connection channels to a housing. Additional sealing elements are required for this. As a whole, the construction of the pressure sensor is quite complicated, and the installation of the pressure sensor into a housing is complicated on account of the necessary arrangement of further sealing elements. Since additional sealing elements must be intermediately mounted between the mounting and the housing, it is furthermore not possible to design the housing as one piece.

BRIEF SUMMARY OF THE INVENTION

It is the object of the invention to provide an improved pressure senor which has a simplified construction and is simpler to integrate into a housing, and which may be applied with corrosive liquids and gases.

A pressure sensor achieves this object with the features specified in claim 1. Preferred embodiments are to be deduced from the dependent claims.

The pressure sensor according to the invention comprises a diaphragm and at least one measurement element arranged on the diaphragm, for detecting a diaphragm deflection. In this manner, when the diaphragm is rigidly clamped in and is impinged by pressure, the acting pressure is detected on account of the deflection of the diaphragm. For accommodating a sealing element, at least one holding element arranged on one surface of the diaphragm is provided. The holding element comprises a through-hole which faces the diaphragm surface and which has a cross section which corresponds to the outer contour of a sealing element to be accommodated. In this manner, the sealing element may be positioned and fixed by the holding element. A sealing element which is fixed on the diaphragm, in this manner, permits the diaphragm together with the holding element to be inserted into a recess in a housing in a direction parallel to the diaphragm surface. Thus the diaphragm with the holding element may be simply inserted into a suitable recess in the housing. At the same time the housing may be designed as one piece since it is not necessary during assembly to apply individual sealing elements between the housing and the diaphragm or its mounting. The sealing elements are fastened on the diaphragm in the desired position by way of the holding element, already before the insertion into the housing.

On each of the two surfaces of the diaphragm which are opposite to one another, in each case there is preferably arranged one holding element each with a through-hole which faces the diaphragm surface and which has a cross section which corresponds to the outer contour of a sealing element to be accommodated. By way of the arrangement of two holding elements, it becomes possible on both diaphragm surfaces which are opposite to one another in each case to fix a sealing element in a desired position. The sealing elements serve for sealing the diaphragm with respect to a housing into which the diaphragm with the holding elements is inserted. With this arrangement too, it is possible to insert the diaphragm with the holding elements into a recess in the housing in a direction parallel to the diaphragm surface. At the same time it is not necessary to provide the housing in two parts since no sealing elements are to be applied between the diaphragm or its mounting and housing during the assembly. The sealing elements are arranged in the corresponding through-holes already before assembly so that they may come to lie at a predefined position between the diaphragm and the housing.

The holding elements in the region of the through-hole usefully have a size (thickness) which is less than the thickness of a sealing element to be inserted. The sealing element may thus project on both sides of the holding element past its surfaces. In this manner one may ensure that the sealing element comes to bear with one side on the diaphragm surface and with the other side on a housing wall of a housing into which the diaphragm is inserted. At the same time it is elastically compressed between the diaphragm surface and the housing so that it comes to bear in a flat and completely sealing manner on the diaphragm surface as well as on the housing.

Preferably, the sealing element is a sealing ring and in particular an O-ring. The through-hole in this case has a diameter which corresponds to the outer diameter of the O-ring so that the O-ring may be fixed in the through-hole with a positive fit. The thickness of the O-ring is preferably larger than the length of the through-hole so that the O-ring may project on both sides or surfaces of the holding element, in order to be able to sealingly bear on the diaphragm surface and a housing wall.

In one preferred embodiment, the sealing element is fixedly connected to the holding element and in particular is designed with this as one piece. For example the sealing element may be formed of an elastomer material which surrounds the holding element with a positive fit in the region of the through-hole. The holding element may be peripherally injected with the elastomer material in the region of the through-hole. In particular, if the holding element and the sealing element are both formed of plastic, it is possible to injection mould both elements to one another so that a single-apiece component arises. At the same time the sealing element is preferably of a material which is different than that of the holding element. In order to ensure adequate sealing properties, an elastomer material is preferred for the sealing element, whilst a stiffer and more shape-stable material is preferred for the holding element.

Preferably both holding elements are connected to one another via at least one locking connection. This permits a very simple assembly since no additional connecting elements or adhesives are required. Such locking connections, in particular in holding elements manufactured of plastic, may be formed very simply as locking lugs or locking hooks which engage on the respective other holding element into a corresponding opening.

It is furthermore preferred for both holding elements to be formed as one piece and to be connected to one another via a hinge. Such a hinge is in particular a film hinge, i.e. a defined weak location in the material about which the two holding elements may be moved towards one another in an articulated manner. Thus the holding elements may be manufactured together as a flat strip for example by injection molding of plastic. At the same time a film hinge connecting the two holding elements is molded with these as one piece. On assembly, the two holding elements may then be folded onto one another about the film hinge. At the same time the two holding elements may preferably lock with one another via suitable locking elements. The diaphragm is then arranged securely between the two holding elements.

Preferably, furthermore, a shoulder surrounding the through-hole for accommodating the diaphragm is formed in at least one holding element on the surface. On assembly the diaphragm lies completely in this shoulder. This permits the surrounding regions of the two holding elements to come to bear on one another since the diaphragm is located in the deepening formed by the shoulder.

In a particularly preferred embodiment, at least one holding element is formed by a circuit board. Further electronic components for example for transmission, evaluation and/or processing of a measurement signal produced by the measurement element may be arranged on this circuit board. The circuit board has a double function, on the one hand it carries the electronic components and on the other hand it simultaneously serves as a holding element for the sealing element. In this manner the number of required components is reduced.

The diaphragm is preferably electrically connected to strip conductors formed on the circuit board via contact locations arranged in the peripheral region of the through-hole. With this arrangement, the diaphragm with corresponding contact locations may be applied directly onto the circuit board so that no leads whatsoever are required for the electrical connection of the diaphragm of the circuit board. For the electrical connection, contact locations come to bear on the diaphragm above the contact locations on the circuit board. The connection of the contact locations to one another is effected in the known manner, for example by way of bonding or soldering. According to a preferred embodiment, the diaphragm may also be glued to the circuit board. With this, one preferably uses an adhesive which shrinks on curing. If such an adhesive is applied in the region of the contact locations, the shrinkage of the adhesive has the effect that on curing of the adhesive, the contact locations on the diaphragm and on the circuit board approach one another so that they come into contact with one another. The surrounding adhesive simultaneously forms a protective layer which protects the formed contact from environmental influences. Alternatively or additionally, the diaphragm and the whole circuit board with the electrical or electronic components arranged thereon are provided with a surface sealing.

It is also preferred for gaps which preferably extend parallel to the diaphragm surface, and which extend from the through-hole to the outer periphery of the diaphragm to be formed between the contact locations between the diaphragm and the circuit-board. These gaps, between individual contact locations, connect the inside of the through-hole to the atmosphere at the outer periphery of the diaphragm. These gaps may be produced by way of the contact locations having a certain construction height so that the diaphragm is arranged distanced to the surface of the holding element or the circuit board. Thus free spaces arise between the individual contact locations, which form the interconnected gaps. The gaps serve for venting the space between the sealing element and the through-hole. This has the advantage that in the case that the sealing element should not be completely diffusion-proof and fluid, in particular moisture reaches the rear side of the sealing element, this may exit through the gaps towards the atmosphere. With this, the accumulation of moisture in the inside of the pressure sensor at the rear sides of the sealing element which are distant to the passage of fluid is prevented. The sealing element is vented to the rear via the gaps so that moisture which possibly enters through the sealing element may exit towards the outside.

A sensor housing is preferably provided, into which the diaphragm with the holding element is inserted in a direction parallel to the diaphragm surface in a manner such that a sealing element inserted into the through-hole of the holding element comes to bear between or butts against a diaphragm surface and the sensor housing. A sensor with such a sensor housing is very inexpensive to manufacture and is easy to assemble. One merely needs to provide a recess or hole in the sensor housing, into which the holding element with the diaphragm is inserted. Such a sensor housing may be designed as one piece since it is not necessary to put together housing parts normally to the diaphragm surface in order to fix sealing elements lying therebetween. By way of the fact that the sealing elements may previously be arranged in the holding elements and fixed, the unit consisting of holding elements, diaphragm and sealing elements my simply be inserted into the sensor housing in a direction parallel to the diaphragm surface.

Preferably two connection holes are arranged in the sensor housing, which in each case lead out in the holding elements opposite to one of the through-holes, wherein sealing elements inserted into the through-holes may come to bear on the periphery of the opening (orifice) of the connection holes on the sensor housing. The connection holes in the sensor housing serve to impinge the diaphragm with a fluid flow or a fluid pressure which are to be measured. It is for example possible to design the pressure sensor as a differential pressure sensor, wherein the diaphragm detects a pressure difference between the two connection holes. It is alternatively possible to impinge one connection hole with a fluid whose pressure is to be determined, and to connect the second connection hole which lies oppositely with respect to the diaphragm, to the atmosphere. In this manner a fluid pressure may be determined with respect to the atmospheric pressure. Furthermore such a sensor housing with the two connection holes opening to the outside may be inserted into a flow in order to detect the pressure differences here.

Advantageously, at least the part of the sensor housing contacted by fluid is designed as one piece. At the same time the part of the sensor housing contacted by fluid is that part in which the diaphragm with the holding elements is arranged, i.e., that part in which the connection holes are formed for impinging the diaphragm with pressure. It is advantageously to design in particular this part, through which a fluid is led to the diaphragm, as one piece since further seals for sealing a multi-part sensor housing then become superfluous. The whole sensor housing is furthermore preferably designed as one piece which permits an economical manufacture of the sensor housing.

BRIEF DESCRIPTION OF THE DRAWINGS

The invention is hereinafter described by way of example and by way of the accompanying figures. In these there are shown in.

DETAILED DESCRIPTION OF THE INVENTION

Figure 1:
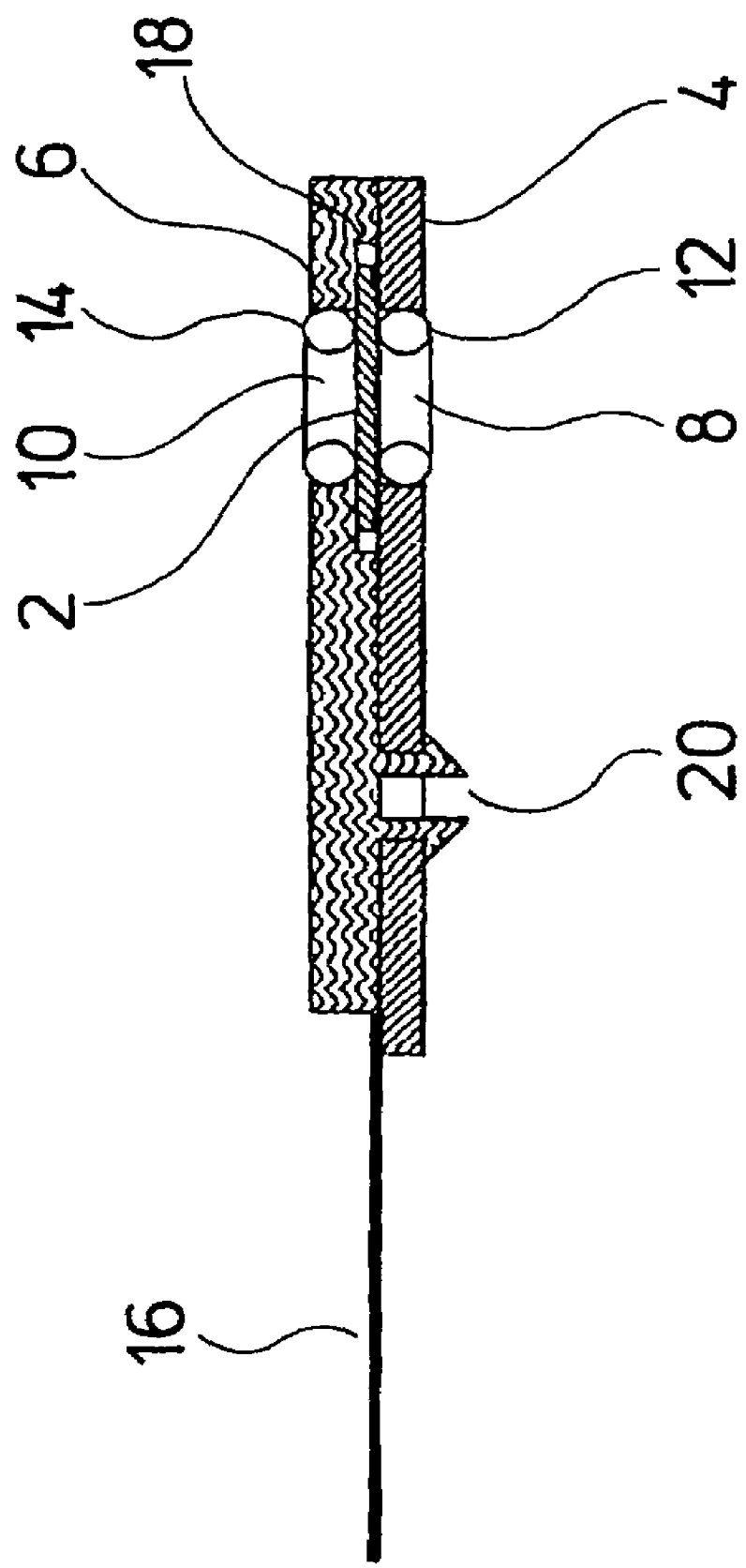
FIG. 1 is a sectioned view of two holding elements with an inserted diaphragm.

FIG. 1 shows a sectioned view of a part of the pressure sensor according to the invention. The pressure sensor comprises a diaphragm 2 on which at least one measurement element is formed for detecting a pressure. For pressure detection the diaphragm 2 is designed as is described in the European Patent application 97 105 396.2. The pressure detection is effected via the deflection of the diaphragm 2 which is detected via the measurement elements arranged on the diaphragm 2. The diaphragm 2 is arranged between two holding elements 4 and 6. Two through-holes 8 and 10 which are flush with one another are formed in the two holding elements 4 and 6. The through-holes 8 and 10 serve for fixing two sealing rings in the form of O-rings 12 and 14. The holding element 14 is designed as a circuit board on which further electronic or electrical components or connections are arranged, in order to transmit and/or process the signals produced by the measurement elements arranged on the diaphragm 2. For signal transmission, the diaphragm 2 is connected to suitable contact locations on the holding element 4, as will be described later. Connection leads 16 extend proceeding form the holding element 4 or the circuit board 4, and these transmit the measurement signals to the outside. Surrounding the through-hole 10 on the side facing the holding element 4, a shoulder or deepening 18 is formed in the holding element 6, in which the diaphragm is accommodated. I.e., the deepening in a direction normal to the surface of the holding element 6 has a depth which corresponds essentially at least to the thickness of the diaphragm 2. This permits the holding elements 4 and 6 to be arranged on one another in a flat and flush manner, wherein the diaphragm 2 is completely accommodated in the recess 18. The holding elements 4 and 6 are firmly connected to one another via a locking connection 20.

The holding elements 4 and 6 with the through-holes 10 and 12 in particular serve for guiding and positioning the sealing elements 12 and 14. The sealing elements 12 and 14 are arranged in the through-holes 8 and 10 in a manner such they come into contact with opposite surfaces of the diaphragm 2. Additionally the sealing elements 12 and 14 in each case have a thickness which is larger than the thickness of the associated holding element 4, 6 so that the sealing elements 12, 14 project beyond the external surfaces of the holding elements 4, 6. This permits the sealing elements 12 and 14 to be able come directly into contact with walls of the housing into which the componentry shown in FIG. 1 is applied. Thus a direct sealing of the diaphragm may be effected on the housing without additional sealing elements having to be added between the holding elements 4 and 6 and bordering housing parts.

Figure 2:
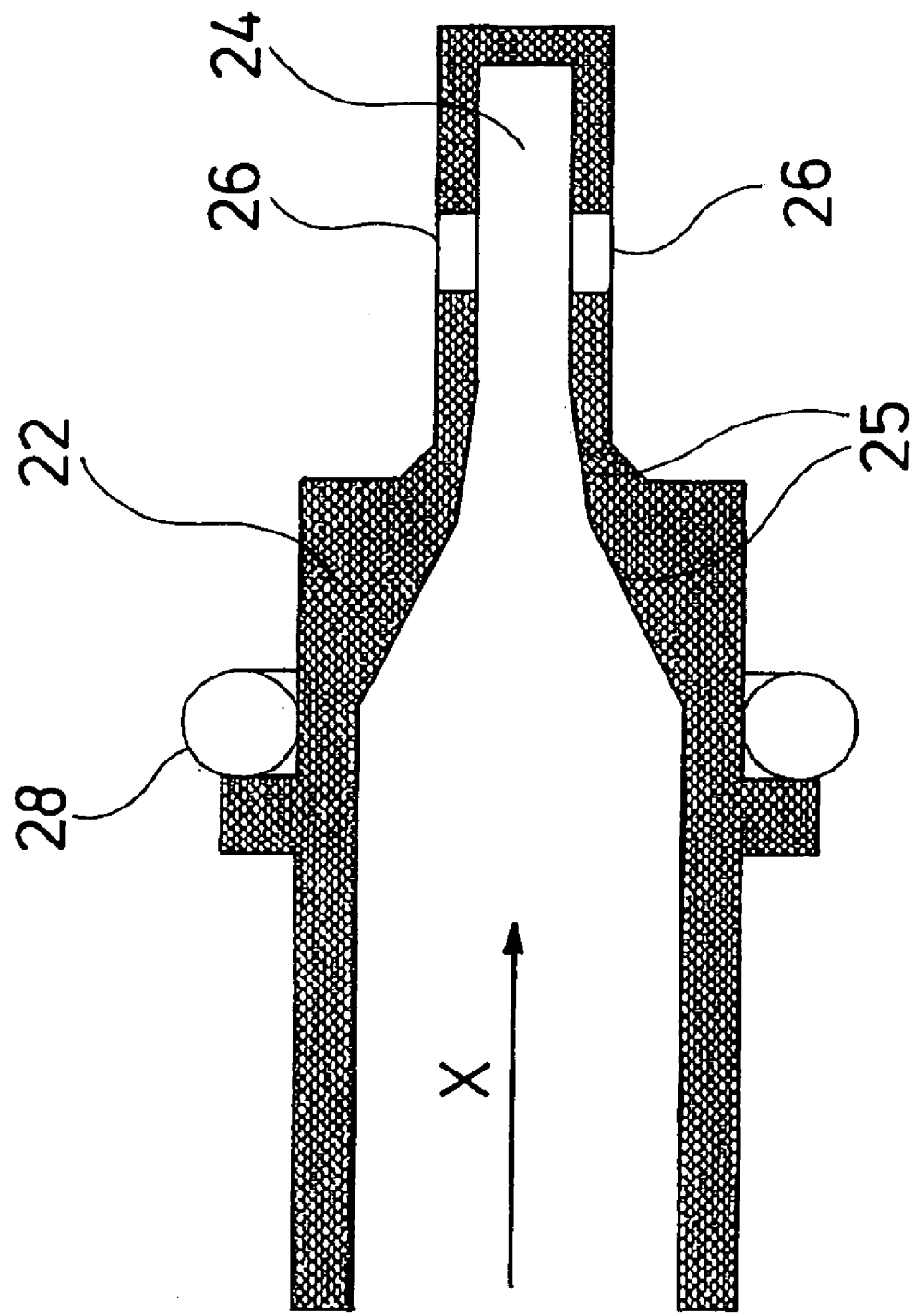
FIG. 2 is a sectioned view of a sensor housing.

FIG. 2 shows the sectioned view of a sensor housing 22 into which the componentry according to FIG. 1 is inserted. The sensor housing 22 comprises an opening 24 into which the componentry according to FIG. 1, consisting of the holding elements 4 and 6 of the intermediately mounted diaphragm 2, and of the sealing elements 12, 14, is inserted in a direction parallel to the surface of the diaphragm 2. Connection holes 26 are formed laterally in the opening 26, and extend essentially normally to the longitudinal axis of the opening 24 or to the insertion direction X of the componentry according to FIG. 1. On inserting the componentry pre-manufactured according to FIG. 1, the sealing rings 12 and 14 inserted into the holding elements 4 and 6 come to bear on the surfaces of the opening 24 in the peripheral region of the connection holes 26. In this manner, the diaphragm is sealed directly with respect to the housing 22 without further interfaces to be sealed arising between the housing 22 and the holding elements 4 and 6. The connection holes 26 are connected to suitable connection conduits or to the surroundings in order to impinge the diaphragm 2 with the desired pressures which are to be detected. A further sealing ring 28 is arranged at the outside on the housing 22, in order to seal the housing 22 when it is applied in an installation or device in which a pressure is to be determined.

Figure 3:
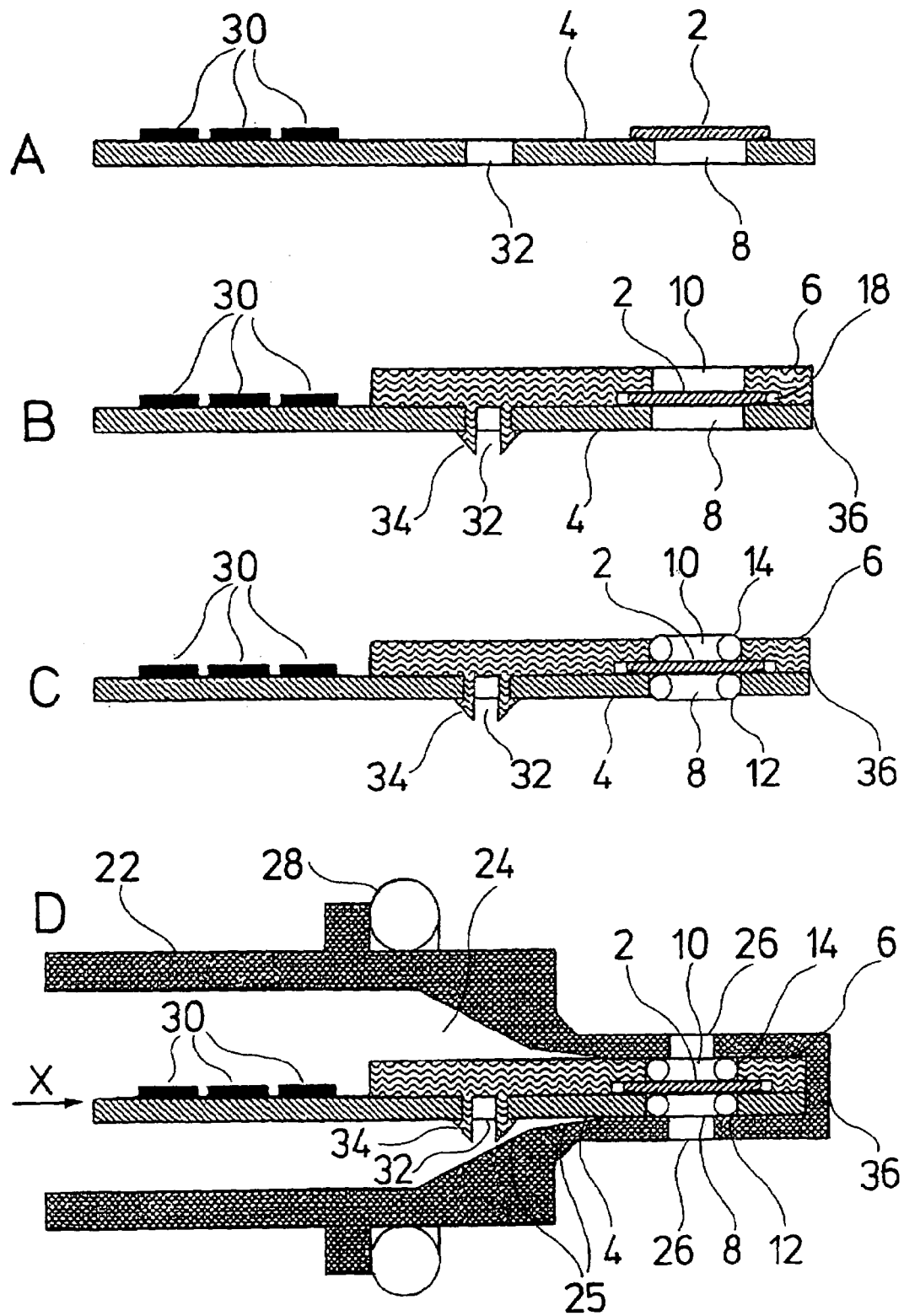
FIG. 3 is schematically, the assembly of the sensor according to the invention.

FIG. 3 in section shows the construction of the pressure sensor according to the invention. In section (A) a circuit board 4 is shown which simultaneously functions as a first holding element. Electronic components 30 for further leading and/or processing of a measurement signal are arranged on the circuit board 4 in a known manner. Furthermore a through-hole 8 is formed in the circuit board 4. The diaphragm 2 is placed onto the circuit board above the through-hole 8. The through-hole 8 later serves for impinging the diaphragm 2 with pressure. The measurement elements arranged on the diaphragm (not shown here in more detail) are electrically connected to strip conductors formed on the circuit board 4. This is effected in that strip conductors or contacts arranged on the diaphragm 2 come into contact with corresponding contact locations on the surface of the circuit board 4. Furthermore, a further through-hole 32 is provided in the circuit board 4 in order to be able to accommodate a locking element for connecting the circuit board 4 to a second holding element 6.

The representation (B) shows the second section of the construction of the sensor according to the invention. The holding element 6 is placed onto the circuit board 4 with the diaphragm 2 arranged on this. At the same time the holding element 6 comes to lie on the circuit board 4 or the first holding element 4 in a flat manner. The diaphragm 2 at the same time is accommodated in a recess 18 on the holding element 6 so that the holding elements 4 and 6 with their surfaces may bear on one another in a flush manner. The through-hole 10 formed in the second holding element 6 comes to lie over the through-hole 8 in the circuit board 4 in an essentially flush manner. Thus later the diaphragm 2 may be impinged with pressure from both sides via the two through-holes 8 and 10 in order to determine a differential pressure between two sides. The holding element 6 comprises a locking projection 34 which faces the circuit board 4 and which engages into the through-hole 32 in the circuit board 4, and in this way locks the holding element 6 with the circuit board 4. Additionally, the holding elements 4 and 6 may alternatively for example be bonded or riveted to one another. In a preferred embodiment the holding element 6 and the circuit board 4 are manufactured as one piece, preferably of plastic. For this, a film hinge may be formed on a side edge 36 between the circuit board 4 and the holding element 6, and this hinge connects the circuit board 4 to the holding element 6. On manufacture, the holding element 6 and the circuit board 4 are then injection molded or cast as a single-piece strip. For assembly, the holding element 6 is then folded about the hinge at the side edge 36, so that as is shown in FIG. 3B, it comes to lie on the circuit board 4 and locks with the circuit board 4 via the locking projection.

In section (C), with the arrangement according to FIG. 3D, sealing rings 12 and 14 are applied from the outside into the through-holes 8 and 10 of the circuit board 4 and the holding element 6. The through-holes 8 and 10 in their dimensioning are preferably matched to the sealing rings 12 and 14 which are to be inserted such that the sealing rings 12, 14 in each case have an outer periphery or outer diameter which corresponds to the inner cross section of the associated through-hole. Thus the sealing rings 12 and 14 may be positioned and fixed on the diaphragm 2 in the directions parallel to the diaphragm surfaces. The sealing rings 12 and 14 each have a thickness which is larger than the thickness of the associated circuit board 4 or the associated holding element 6 in the region of the through-hole 8 or of the through-hole 10. In this manner one provides for the sealing ring 14 to project beyond the outer surface of the holding element 6 and for the sealing ring 12 to project outwards beyond the outer surface of the circuit board 4.

FIG. 3D shows the condition in which the preassembled componentry according to FIG. 3C is pushed or inserted into a sensor housing according to FIG. 2. The housing 22 may be designed as one piece and has an opening 24. The componentry according to FIG. 3C consisting of the two holding elements 4 and 6, of the diaphragm 2 as well as of the inserted sealing elements 12 and 14, is inserted into this opening 24 in the direction of the arrow X, i.e., in a direction parallel to the surface of the diaphragm 2. Preferably a chamfer 25 is formed at the opening 24 in order to prevent any damage to the sealing elements 12 and 14. At the same time the regions of the sealing elements 12 and 14 which project to the outside beyond the surfaces of the circuit board 4 and of the holding element 6 come to sealingly bear with the inner walls of the opening 14. In this manner the diaphragm 2 is sealed towards the surfaces in the inside of the opening 24. The circuit board 4 with the holding element 6 is inserted so far into the opening 24 that the through-holes 8 and 10 are arranged flush with the connection holes 26 in the housing 22. At the same time the sealing elements 12 and 14 in the peripheral region of the connection holes 26 come to bear on the inner wall of the opening 24. Thus a sealed passage from the connection holes 26 to the diaphragm surfaces of the diaphragm 2 which are opposite one another is created. In this manner the diaphragm 2 may be impinged with pressure from two sides via the connection holes 26, in order to determine a pressure difference between two sides on account of an occurring deflection of the diaphragm. The sensor assembled in this manner may be applied into an apparatus in which a pressure is to be determined. At the same time, the housing 22 on its outer periphery comprises a further sealing element 28 which seals the sensor in a suitable opening or receiver of the apparatus.

Figure 4:
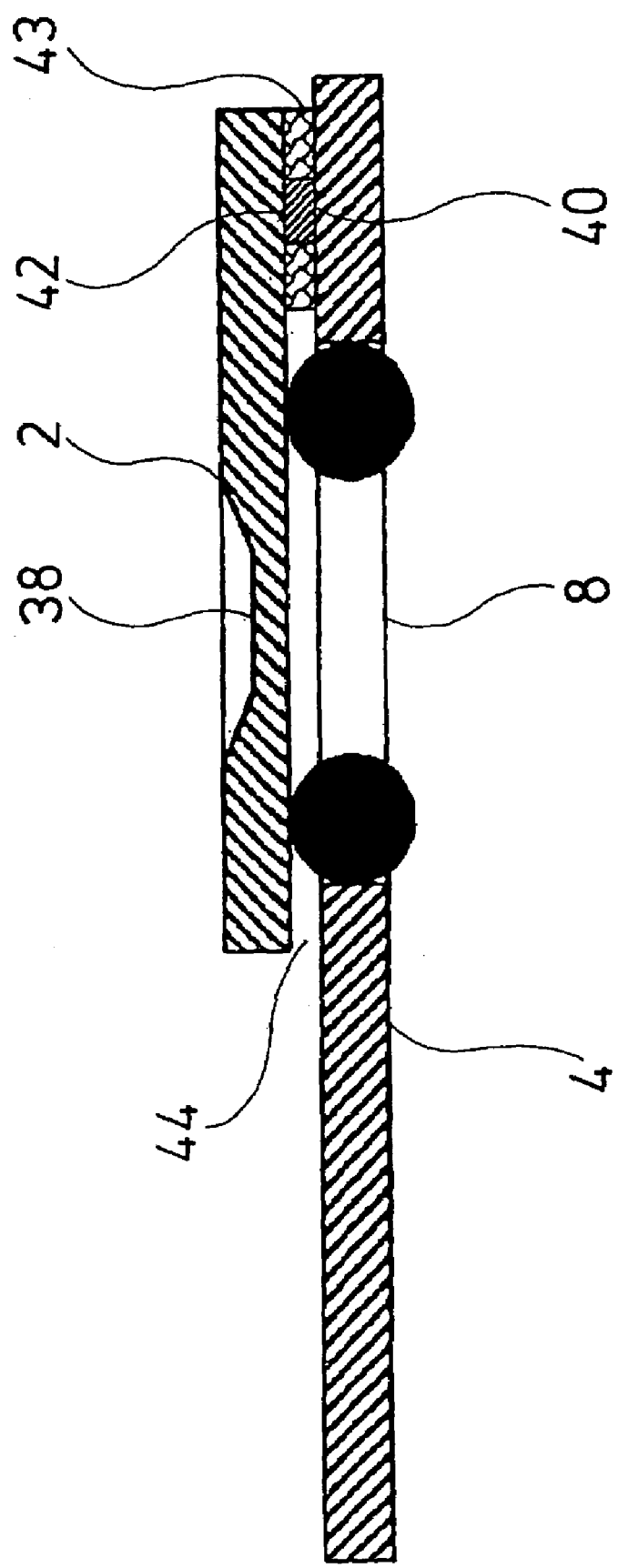
FIG. 4 is a sectioned view of a holding element with a diaphragm placed thereon.

FIG. 4 shows a schematic sectioned view of the end region of the circuit board 4 with an attached diaphragm 2. The diaphragm 2, as described in the European Patent application EP 97 105 396.2, in its middle region has a tapered region 38 which forms the actual diaphragm which is deflected for determining the pressure. The peripheral region of the thinned or tapered region 38 functions as a support (carrier). The diaphragm 2 is arranged over the through-hole 8 in the circuit board 4 such that the tapered region 38 is arranged as centrically as possible to the through-hole 8. The electrical or electronic components for determining the deflection of the diaphragm 2 or of the tapered region of the diaphragm 2, which are arranged on the diaphragm 2, are electrically connected to the circuit board 4 via contact locations 40 and 42. On the diaphragm 2, suitable strip conductors lead from the measurement elements to contact locations 40 which face the circuit board 4. Contact locations 42 are formed on the surface of the circuit board 4, which come into contact with the contact locations 40 on the diaphragm 2. The contact locations 42 are connected to further electronic components 30 on the circuit board 4 and/or connection leads 16 via strip conductors formed on the circuit board 4.

Figure 5:
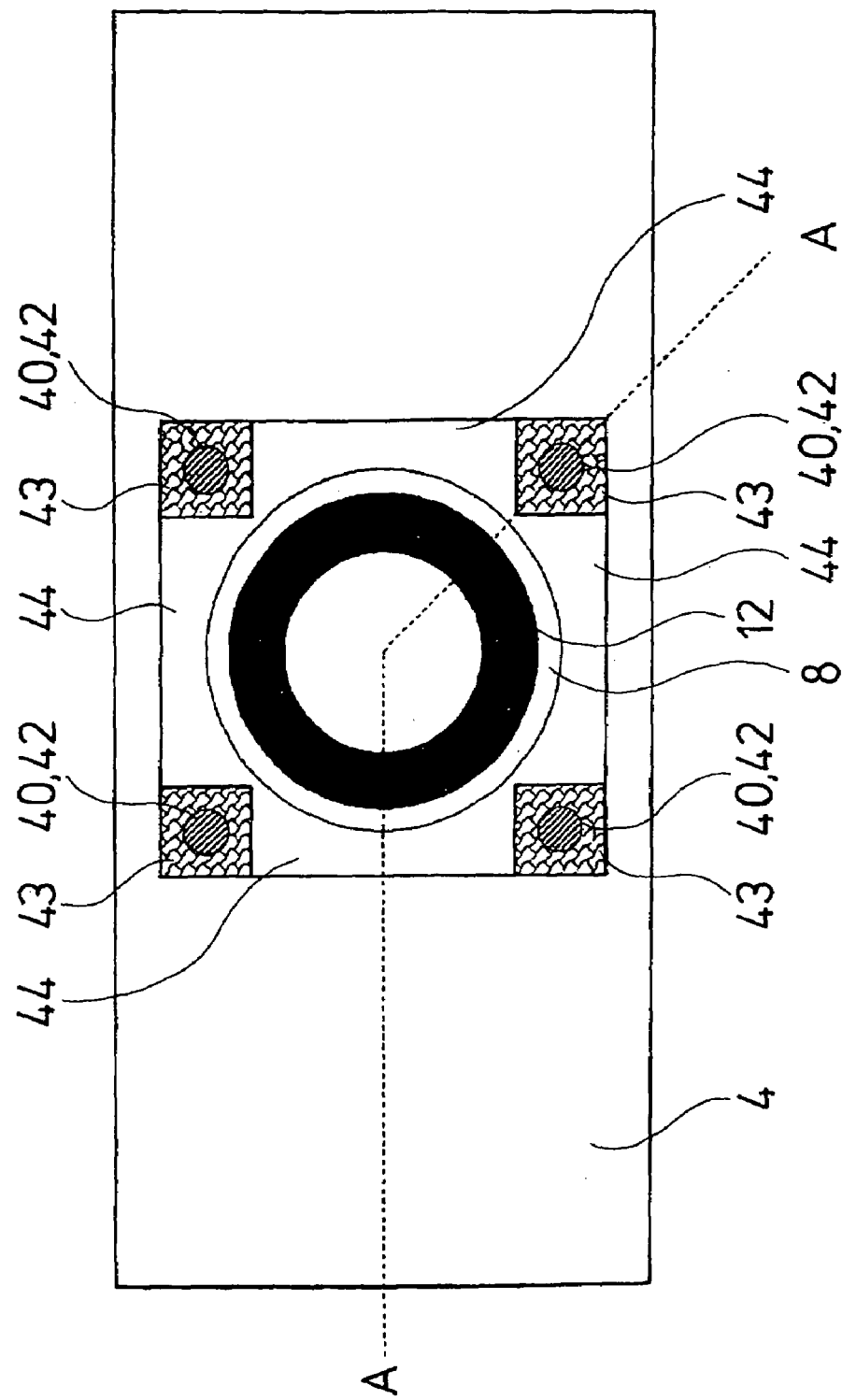
FIG. 5 is a plan view of the arrangement according to FIG. 4.
Figure 6:
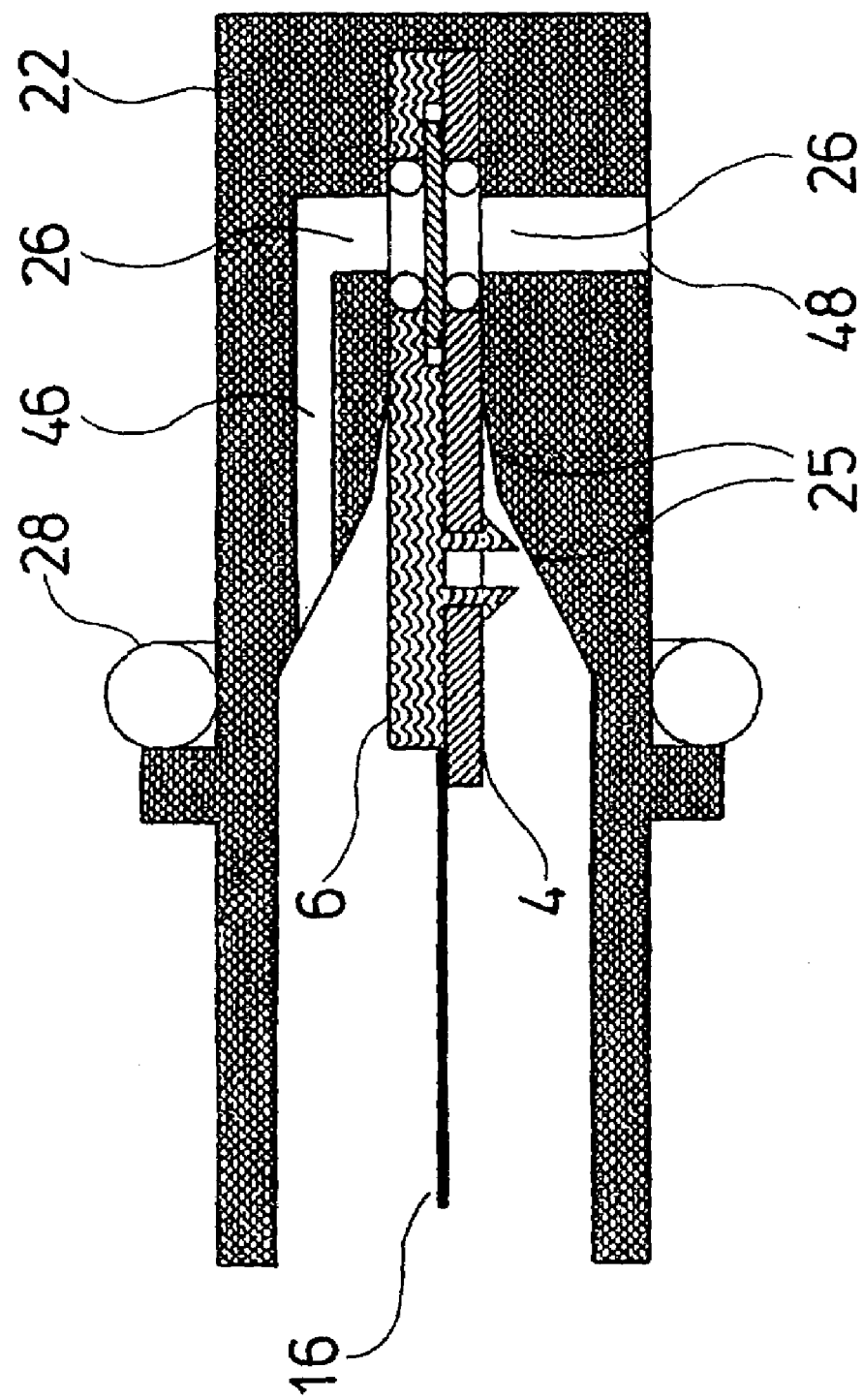
FIG. 6 is a sectioned view of a preferred embodiment form of the sensor according to the invention.

FIG. 5 shows a plan view of the circuit board 4 with the diaphragm 2 according to FIG. 4. With this, line A—A in FIG. 5 indicates the section line along which the section according to FIG. 4 runs. Shown in the schematic representation according to FIG. 5 are also the elements which are actually situated below the diaphragm 2 in the view. Thus the sealing ring 12 in the form of an O-ring is arranged in the through-hole 8 in the circuit board 4. The contact locations 42 which are in contact with corresponding, oppositely lying contact locations 40 on the diaphragm 2 are located at four points uniformly distanced from one another peripherally of the through-hole 8. The connection of the contact locations 40 and 42 to one another is effected for example in the known manner by way of soldering or bonding. Alternatively, it is also possible to connect the diaphragm 2 to the circuit board 4 by way of an adhesive 43. At the same time the adhesive 43 is preferably selected such that it shrinks on curing. If such an adhesive 43 is used in the region of the contact locations 40, 42, the shrinkage of the adhesive 43 on curing has the effect that the contact locations 40 and 42 are pulled onto one another and come to bear on one another in a contacting manner. The surrounding adhesive 43 simultaneously forms a protective layer. The contact locations 40 and 42 normal to the surface of the circuit board have such a constructional height that the diaphragm 2 is arranged distanced to the circuit board 4. On account of this, gaps 44 situated between the contact locations arise, which serve for venting the through-hole 8. The gaps extend from the rearward space of the sealing element 12 in the through-hole 8 to the outer periphery of the diaphragm 2. This has the advantage that a fluid, in particular moisture which penetrates through the sealing element 12, may also escape to the outside out of the rearward space between the sealing element 12 and the inner wall of the through-hole 8. The holding element 4, 6 may be provided with a connection channel for this purpose.

The FIGS. 6 to 9 show different embodiments of the housing 22, wherein the componentry arranged in the inside of the housing 22, consisting of the circuit board 4, the holding element 6, the diaphragm 2 and the sealing elements 12 and 14, is always formed identically and corresponds to the arrangement described by way of FIGS. 1 and 3. The housing 22 according to FIG. 6 corresponds essentially to the construction of the housing explained by way of FIG. 2 and FIG. 3D. Two connection holes 26 are formed in the housing, which are in connection with the through-holes 8 and 10 in the circuit board 4 or the holding element 6, for impinging the diaphragm 2 with pressure. According to the embodiment in FIG. 6, the one connection hole 26 is connected to a channel 46 which extends into the rearward space of the housing 22 in which the connection leads 16 for the pressure sensor are also located. This region is the region of the housing 22 which is distant to a fluid to be measured. The channel 46 is thus in connection with the surrounding air on the outer side of the sensor. This permits the pressure of a fluid entering into the channel 48 with respect to the pressure of the surroundings to be determined. The channel 48 is connected to the second connection opening 26 so that a fluid impinges the diaphragm 2 with pressure through the channel 48.

Figure 7:
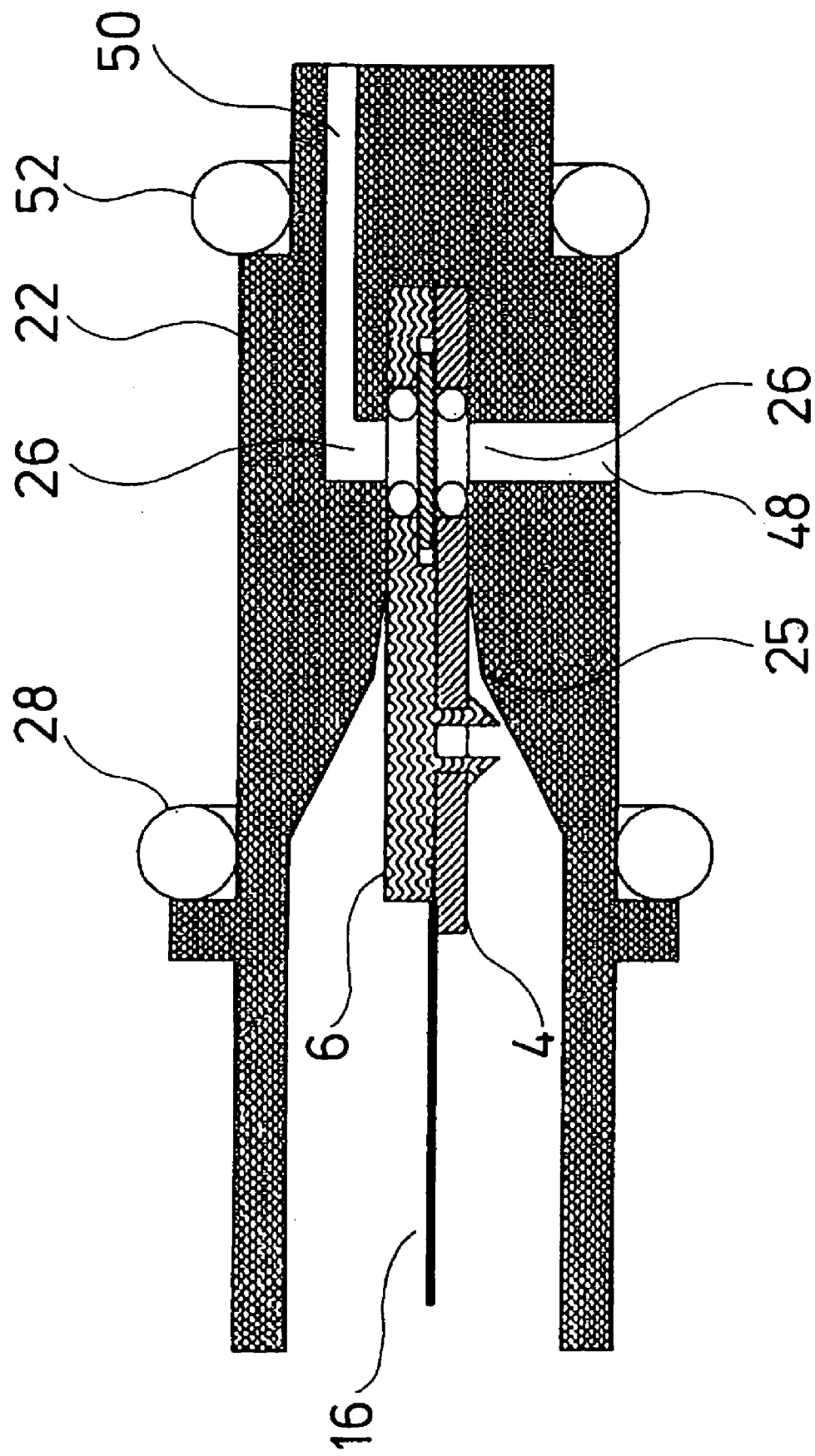
FIG. 7 is a sectioned view of a further embodiment.

FIG. 7 shows a further embodiment of the housing 22. In this housing too there is a channel 48 by way of which the diaphragm 2 may be impinged with a pressure from a fluid. This channel 48 opens out at the outer side of the housing 22. The housing 22 according to FIG. 7 has a second sealing ring 52 on its outer side. The channel 48 opens out in the space between the two sealing rings 28 and 52 and in this manner may be connected to a first fluid channel. The second connection hole 26 which is situated on that side of the diaphragm 2 which is opposite to the channel is connected to a channel 50. This channel 50 likewise opens to the outer side of the housing 22 into a region which is separated by the sealing ring 52 from the region into which the channel 48 opens out. In this manner it becomes possible to measure a differential pressure between the channels 48 and 50, wherein the channels 48 and 50 may in each case be connected with a fluid conduit. In this manner one may determine a pressure difference between two conduits.

Figure 8:
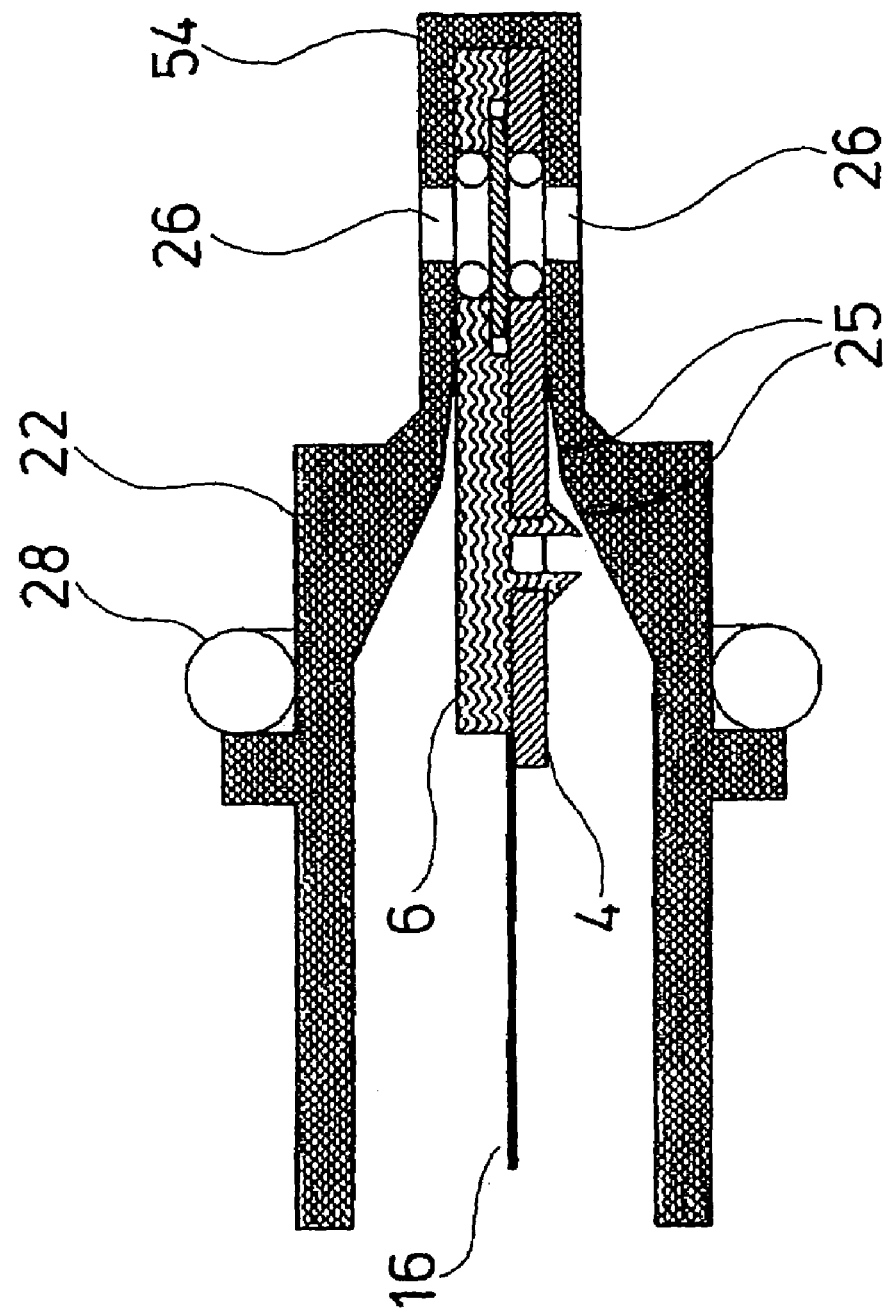
FIG. 8 is a sectioned view of a third embodiment form and FIG. 9 is a sectioned view of a fourth embodiment form.

FIG. 8 shows a third embodiment of the housing 22. With this embodiment the connection holes 26, proceeding from the diaphragm 2, in the extension of the through-holes 8 and 10 in the circuit board 4 and the holding element 6, extend normally and outwards to the outer side of the housing 22. The region of the housing 22 in which the diaphragm is arranged is designed as a tapered projection 54 on whose two opposite sides in each case a connection hole 26 opens out. The housing 22 formed in this manner may be applied into a fluid channel, wherein it is sealed to the outside by the seal 28. At the same time the projection 54 projects into the fluid flow and in this manner may detect pressure differences within the fluid flow.

Figure 9:
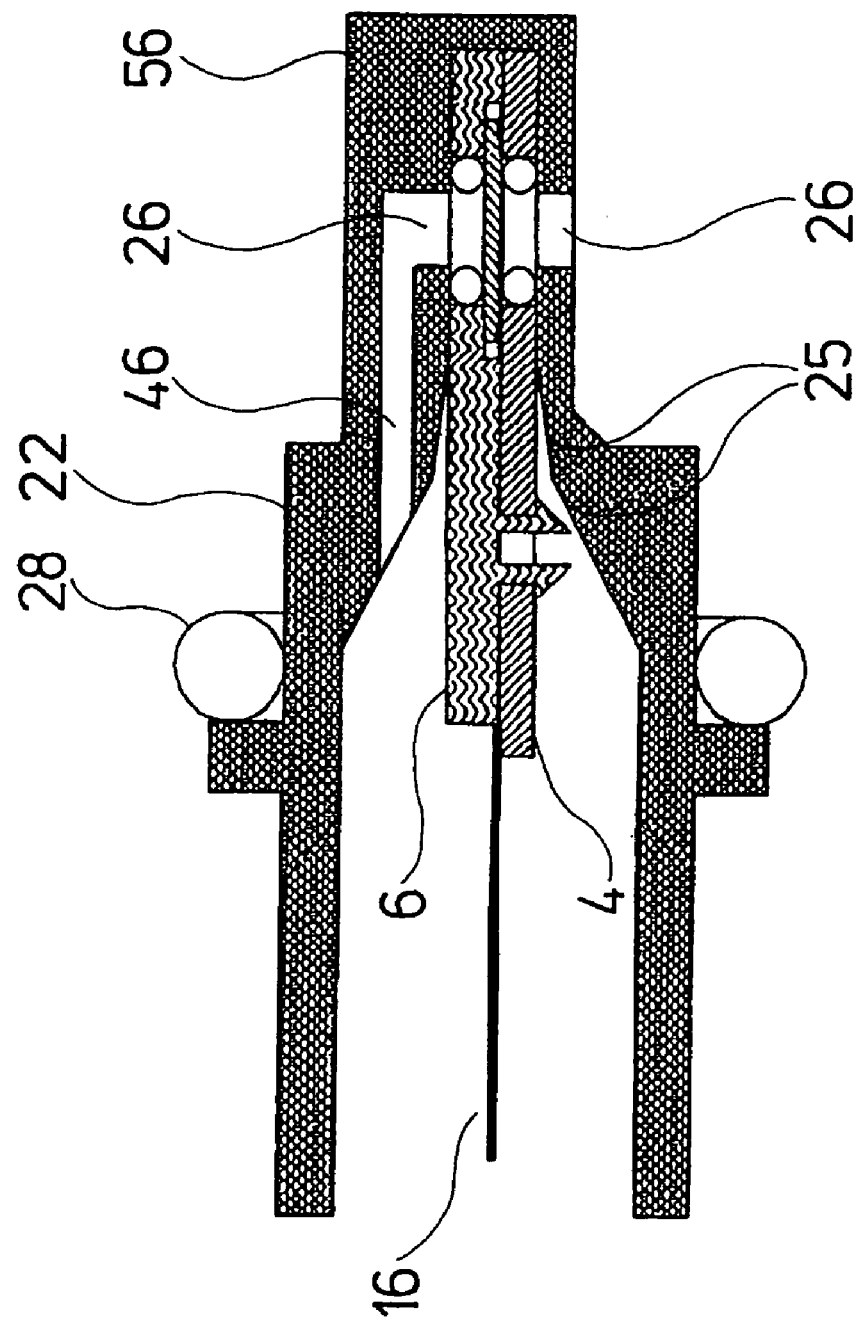

FIG. 9 shows a fourth preferred embodiment of the housing 22. This embodiment corresponds essentially to that embodiment described by way of FIG. 6, but the section of the housing contacted by the fluid, in which the diaphragm is arranged, is designed in a similarly narrow manner to the projection 54 in FIG. 8. The projection 56 formed in this manner may likewise be used to project into a flow in order to determine a pressure there. At the same time the one connection opening 26 opens to the outer side of the projection 56, i.e. into the fluid flow, whilst the second connection opening 26 is connected to the surroundings via the channel 46. This corresponds to the design according to FIG. 6. Thus here one may determine a pressure in a fluid flow relative to the pressure of the surroundings.

LIST OF REFERENCE NUMERALS

2—diaphragm
4—circuit board
6—holding element
8—through-hole
10—through-hole
12,14—sealing elements
16—connection leads
18—recess
20—locking connection
22—housing
24—opening
25—chamfer
26—connection holes
28—seal
30—electronic components
32—through-hole
34—locking projection
36—side edge
38—tapering
40,42—contact locations
43—adhesive
44—gap
46—channel
48—channel
50—channel
52—seal
54—projection
56—projection

The invention claimed is:

1. A pressure sensor with a diaphragm and at least one measurement element arranged on the diaphragm, for detecting a diaphragm deflection, characterized by at least one holding element arranged on a surface of the diaphragm for accommodating a sealing element, with a through-hole which faces said surface of the diaphragm and which has a cross section corresponding to said outer contour of said sealing element to be accommodated.

2. A pressure sensor according to claim 1, wherein the sealing element is a sealing ring, and in particular an O-ring.

3. A pressure sensor according to claim 2, wherein the two holding elements are connected to one another via at least one locking connection.

4. A pressure sensor according to claim 1, wherein the sealing element is firmly connected to the holding element and in particular is formed with this as one piece.

5. A pressure sensor according to claim 1, wherein in at least one holding element on one surface there is formed a shoulder surrounding the through-hole, for accommodating the diaphragm.

6. A pressure sensor according to claim 1, wherein at least one holding element is formed by a circuit board.

7. A pressure sensor according to claim 6, wherein the diaphragm via contact locations arranged in the peripheral region of the through-hole is electrically connected to strip conductors formed on the circuit board.

8. A pressure sensor according to claim 7, wherein between the contact locations between the diaphragm and the circuit board, preferably parallel to the surface of the diaphragm, there are formed gaps extending from the through-hole to the outer periphery of the diaphragm.

9. A pressure sensor according to claim 1, wherein a sensor housing is provided into which the diaphragm with the holding element is inserted in a direction parallel to the diaphragm surface in a manner such that a sealing element inserted into the through-hole of the holding element comes to bear between a diaphragm surface and the sensor housing.

10. A pressure sensor according to claim 9, wherein two connection holes are arranged in the sensor housing, which in each case, lying opposite to one of the through-holes, lead out in the holding elements, wherein sealing elements inserted into the through-holes come to bear on the sensor housing at the periphery of the opening of the connection holes.

11. A pressure sensor according to claim 10, wherein at least the part of the sensor housing contacted by fluid is designed as one piece.

12. A pressure sensor according to claim 9, wherein at least the part of the sensor housing contacted by fluid is designed as one piece.

13. A pressure sensor with a diaphragm and at least one measurement element arranged on the diaphragm, for detecting a diaphragm deflection, characterized by at least one holding element arranged on a surface of the diaphragm for accommodating a sealing element, with a through-hole which faces said surface of the diaphragm and which has a cross section corresponding to said outer contour of said sealing element to be accommodated, wherein a holding element in each case is arranged on each of the surfaces of the diaphragm which are opposite to one another, each with a through-hole which faces the surface of the diaphragm and which has a cross section corresponding to the outer contour of a sealing element to be accommodated.

14. A pressure sensor according to claim 13, wherein the holding elements in the region of the through-hole have a size (thickness) which is less than the thickness of sealing element to be inserted.

15. A pressure sensor according to claim 13, wherein the two holding elements are connected to one another via at least one locking connection.

16. A pressure sensor according to claim 15, wherein the two holding elements are formed as one piece and are connected to one another via a hinge.

17. A pressure sensor according to claim 2, wherein the two holding elements are formed as one piece and are connected to one another via a hinge.

18. A pressure sensor according to claim 13, wherein a sensor housing is provided into which the diaphragm with the holding element is inserted in a direction parallel to the diaphragm surface in a manner such that a sealing element inserted into the through-hole of the holding element comes to bear between a diaphragm surface and the sensor housing.

19. A pressure sensor according claim 13, wherein in at least one holding element on one surface there is formed a shoulder surrounding the through-hole, for accommodating the diaphragm.

20. A pressure sensor according to claim 13, wherein at least one holding element is formed by a circuit board.

21. A pressure sensor according to claim 13, wherein the holding elements in the region of the through-hole have a size which is less than the thickness of sealing element to be inserted.

22. A pressure sensor according to claim 13, wherein the sealing element is a sealing ring, and in particular an O-ring.

23. A pressure sensor according to claim 13, wherein the sealing element is firmly connected to the holding element and in particular is formed with this as one piece.

* * * * *